United States Patent Office 3,455,736
Patented July 15, 1969

3,455,736
CURED POLYARYLENE OXIDES AND PROCESS
THEREFOR
Horace R. Davis, Roseville Village, and Charles W.
Taylor, Oakdale Township, Washington County,
Minn., assignors to Minnesota Mining and Manufacturing Company, St. Paul, Minn., a corporation of Delaware
No Drawing. Filed Mar. 23, 1967, Ser. No. 625,319
Int. Cl. B44d 1/18, 1/22
U.S. Cl. 117—218                                    26 Claims

ABSTRACT OF THE DISCLOSURE

Tough, self-supporting films or tough adherent coatings on metallic, glass or ceramic substrates of crosslinked or cured poly(phenylene oxide) polymers prepared by heating a self-supporting film of uncrosslinked poly(phenylene oxide) or the article covered with a film of uncrosslinked poly(phenylene oxide) in the presence of oxygen at a temperature in the range of 200° to 470° C., and at least above the crystalline melting point of the polymer if it has a crystalline melting point, for a period of time sufficient to render the film or coating tack-free at 150° C. The films or coatings may contain pigments or other adjuvant substances. Particularly useful adjuvants are metal oxides, sulfides and selenides.

BACKGROUND OF THE INVENTION

The field of art to which this invention pertains is that of polyarylene oxide polymers, and more particularly, to such polymers having improved properties and the process for providing such improvement.

Polyarylene oxides have been known in the prior art, and in general have been prepared by two methods, viz. oxidation of phenols as exemplified by the disclosures in United States Letters Patent 3,134,753 and British Letters Patent 930,993; and by the condensation of alkali metal salts of halophenols in the presence of a copper catalyst, as described in United States Letters Patent 3,268,478. These disclosures are also exemplary of the properties of the polymers heretofore known. It will be apparent from study of the prior art that the polyarylene oxide polymers, while having useful properties, are not in some respects adequate to provide materials useful for stringent requirements of temperature or solvent resistance. To remedy their disadvantages relative to thermal stability, it has been suggested that substituent-free phenylene radicals be provided in the polymer chain and that the polymers be prepared as linear polymers. The prior art teaches that crosslinking is to be avoided if strong polymers are to be obtained. Thus, it has been stated that crosslinking of the polymers by reacting the terminal groups with suitable crosslinking agents produces infusible brittle products.

Linear chain growth is therefore stressed if strong high melting polymers with good thermal stability are to be obtained. Some of these polymers, however, are still soluble in a number of solvents, including such common organic liquids as chloroform, benzene, toluene and xylene. It has also been found that such linear polymers are not strongly adherent to metallic or other substrates, and have poor impact resistance. Thus, even when carefully selected, unsubstituted starting materials are used, the polyarylene oxide homopolymers of the prior art disclosed before this invention was made still lack desirable impact strength and toughness as self-supporting films when exposed to air at high temperature, and have poor adherence when used as a coating. Amorphous polymers of the prior art also have poor solvent resistance.

SUMMARY OF THE INVENTION

The present invention embodies a process in which certain linear or substantially linear polyphenylene oxide polymers having inherent viscosity when amorphous not less than about 0.1 in chloroform solution, and when crystalline, not less than about 0.2 in concentrated sulfuric acid, are cured by heating them in the presence of oxygen, either as a self-supporting film or as a coating upon a substrate capable of resisting the temperatures employed in curing (e.g. metals, glass, ceramics and the like), to a temperature in the range of about 200° to 470° C., if accelerators are used, and about 300° to 470° C. without accelerators, and if the polymer employed is crystalline, above the crystalline melting point of the polymer, for a period of time sufficient to render the polymer tack-free at 150° C. This curing period is from about 5 minutes to 12 hours, being shorter at the higher temperatures, and when accelerators are present, and longer at the lower temperatures and when accelerators are not used. The resulting polymer is tough, infusible, insoluble in all common organic solvents and, if a coating on a substrate, strongly adherent thereto. The dielectric properties of the cured polymers are even better than those of the selected high molecular weight unsubstituted homopolymers of the prior art, where those homopolymers are cured by the process of the invention.

It is found that the properties of all polyphenylene oxides are enhanced by the process of the invention, although those polymers having less strength are only proportionately increased in strength.

Particularly useful and advantageous cured polymeric products of the invention and included within the scope thereof are cured polyphenylene oxides containing particulate additives dispersed therein. Such additives can include flow control agents, pigments, viscosity regulators, high temperature curing accelerators and/or extenders. Desirably these materials are inorganic, compatible with the selected polymers and have melting points higher than the temperature used for curing.

As starting materials for the cured products, mixtures of finely divided uncured polyphenylene oxides with additives are storable, free-flowing mixtures which can be kept substantially indefinitely under ordinary conditions. These powdered mixtures are especially useful for coating articles by application to the preheated article using the known fluidized bed techniques. Such mixtures containing certain ingredients which bring about unexpected advantages during the polymer-curing process are also invention embodiments included within the scope hereof, as will be apparent hereinafter.

Particularly useful additives for the purpose of the invention are the chalcogenides of metals having atomic number from 12 to 83.

Certain metal oxides which have multivalent forms in a higher valence form are accelerators for the curing process. They do not react as such until the temperature reaches about 150° C., when they cause rapid and complete curing. During this process they are believed to be transformed to lower-valent oxides, which are no longer active as accelerators and have no further curing effect. Thus, although they are functional, these materials are compatible with the polymers. Examples of such accelerators are manganese dioxide, vanadium pentoxide, lead dioxide, red lead oxide and the like.

These metal oxides are added to the polymer to be cured in the form of finely divided powder and intimately mixed therewith, in amount of one to 100 parts by weight for each 100 parts of polymer. A 150° C. tack-free cure can then be achieved at lower temperatures with the same time of curing as if these accelerators had not been added, or at shorter times at higher temperatures. (It is of course always necessary to heat the polymer above its crystalline melting point, if it has a crystalline melting point.) After the curing process, these materials or the products to which they are converted during the curing process remain in the cured polymer as a pigment or extender. Other additives, such as pigments, leveling agents, flow control agents and the like can be added to polymer mixtures containing the metallic oxide accelerators, without interfering with the accelerating action.

The cured polymer films and coatings of the invention are useful as dielectrics (electrical insulators), protective and beautifying coatings for substrates, and as heat and corrosion resistant materials of construction.

According to the invention, it has been found that polyphenylene oxide polymers, which are ordinarily thermoplastic, can be converted into infusible, tough, useful materials having high resistance toward solvents or corrosive materials by a curing treatment. The resulting polymers are not to be confused with brittle, intractible crosslinked materials which can be formed from polyphenylene oxides which are simply heated for a time in air or vacuum.

The process of the invention consists essentially of heating the selected polyphenylene oxide polymer in the presence of oxygen at relatively high temperature for a period of time not less than that required to produce a polymer which is tack-free at 150° C.

The temperatures which are employed in the process range from 200° to 470° C. and if the selected polymer is crystalline, the temperature of treatment, or curing as it may be termed, is not less than the crystalline melting point of the polymer. When accelerators are used, the temperatures of curing can be as low as 200° C., but without the accelerators the range employed is from 300° to 470° C.

The time required to render the polymer tack-free varies, being shorter with polymers of high inherent viscosity and longer with polymers of low inherent viscosity. Likewise, the use of accelerators shortens the time required. Ordinarily, from about 5 minutes to 12 hours are required to produce a cured polymer as described herein, but as a practical matter, the curing temperatures for the particular polymer, with accelerator if desired, ranges from 10 minutes to 2 hours.

Example 1

Mild steel bars, 4½″ x 1″ x ⅛″ in size, were degreased and freed from burrs and rough edges before being placed in a muffle-furnace at about 330° C. A vibrated bed of finely powdered (<80 mesh) poly(p-phenylene oxide) of inserent viscosity 0.30 in concentrated sulfuric acid, prepared by reacting potassium p-chlorophenolate in pyridine solution with cuprous chloride catalyst, first at 170–180° C. and then at 250° C., followed by recovery of the polymer by working with dilute hydrochloric acid, acetone, water and methanol, in that order, was fluidized with a stream of air, and the preheated bars were immersed in the bed for 1–1.5 seconds with a rapid swirling motion, then removed. One coated bar was allowed to cool to room temperature gradually, and within five minutes the coating cracked and in places broke away from the bar. A second coated bar was placed in a forced draft oven at 315° C. for 15 minutes on removal from the fluidized bed. This cured coating, when cooled to room temperature, did not crack, but remained smooth and adherent to the metal bar. A Gardner impact test broke the coating on the front side with a blow of less than 40 inch pounds.

Three other bars were similarly coated and cured in the oven at 315° C. for 60 minutes, 90 minutes and 120 minutes, respectively. Results of the Gardner impact test on all four of these specimens are given in Table I.

TABLE I

| Time of 315° C. cure (in minutes) | Gardner impact (inch-pounds) | |
|---|---|---|
| | Front side | Reverse side |
| 15 | <40 | <40 |
| 60 | <40 | 40 |
| 90 | 80 | 60 |
| 120 | 160 | 160 |

A sample of poly-p-phenylene oxide having an inherent viscosity of 0.44 inconcentrated sulfuric acid was placed between aluminum platens and pressed at about 335° C. The film was immediately quenched by immersion in ice water, removed from the platens and cured by heating 30 minutes at about 330° C. in a forced air oven.

This cured film was placed on a glass slide on a hot plate covered by an inverted petri dish and maintained at 150° C. as determined by a Pendex surface thermometer. After 15 minutes the film had no tack as determined by touching with a stainless steel spatula and by lack of adhesion to itself when folded. The film was still flexible and tough and could be folded and creased repeatedly but was infusible and could not be repressed, even at temperatures in excess of 335° C. A 100 mg. sample of the film was insoluble in 10 ml. of diphenyl ether at 250° C. A thermogravimetric analysis (5° C. temperature increase per minute) in air showed a 10 percent weight loss at 510° C., but only 3 percent at 450° C.

Another sample of film which was pressed and quenched as described above but not further treated was also heated 15 minutes at 150° C. It was tack-free at this temperature but extremely brittle and could not be folded. Furthermore, it was fusible, could be comminuted and repressed at 335° C., and dissolved readily in diphenyl ether at 250° C.

In another aspect of the invention, coatings can be made from combinations of one or more of the aforementioned poly(phenylene oxides) mixed together with one or more inorganic viscosity regulators, leveling agents, pigments and/or extenders.

Mixing the screened polymer with various inorganic adjuvants is preferably done thoroughly to insure that the finely powdered solids are intimately blended. In the ideal state, particles of polymer as seen under an optical microscope are completely coated with still finer particles of inorganic component. Dry blending in a Waring Blendor or in a vibrating ball mill such as that available under the trade name Vibratom for 5 to 30 minutes will give adequate mixing of two or more components such that smooth, continuous coatings can be obtained. Inadequate mixing such as is obtained by simple stirring or tumbling of the solids together gives coatings that are rough and that frequently contain discontinuities or pinholes. This makes the coatings unsuitable for corrosion protection or electrical insulation, but suitable for less demanding purposes.

After mixing, the polymer and additives are free-flowing powders that can be stored indefinitely without any particular protection from air, atmospheric moisture or moderate heat (about 100° C.).

The selection of additives, whether used as viscosity regulators, pigments, leveling agents or as extenders, and the proportion with which they are used with the poly(p-phenylene oxide) is based on the requirements of durability, appearance, continuity, adhesion, corrosion and solvent resistance and electrical resistivity of the resulting coating. In general, the suitable additives are finely powdered, inorganic solids with melting and/or decomposition points above the curing temperature of the polymer, non-pyrophoric, inert to atmospheric oxygen and moisture at room temperature, not prone to decompose or evolve gaseous by-products at the coating and curing temperatures employed.

From this its can be seen that hydrated salts are generally not suitable adjuvants for use in coatings having high requirements since nearly all of them evolve water vapor at or near 100° C., and this causes bubbles, holes and other discontinuities in the coating, although proper mixtures can give foamed coatings. Also, materials that have been coated with thermally unstable flow-improvement agents, as when stearic acid or a long chain aliphatic amine is added to bentonite, montmorillonite or other clays, are not suitable for some purposes since these materials evolve gaseous decomposition products at the coating and curing temperatures.

Many of the inorganic materials that are suitable additives for these coatings have the quality of controlling the tendency of these polymers to sag or run under the conditions of coating and curing. Coatings can be prepared from polymer without the additives, as shown above, but the ease with which serviceable, attractive coatings are prepared is greatly enhanced by their use. Not all inorganic substances that are thermally stable, finely powdered, non-pyrophoric solids are suitable as viscosity regulators, nevertheless are useful as pigments or extenders.

Substances that are useful for the coating, meeting the highest requirements or difficult conditions, include metals, metal fluorides and metal chalcogens of metals between atomic numbers 12 and 83. This includes compounds of elements within Periods III to VI of the Periodic Table.

Within this group, the metals aluminum, zinc and cadmium are particularly useful.

Among the chalcogens, the oxides of metals in Group IIa, IIb, IIIa, IVa, IVb, Vb, VIb, VIIb and the rare earth metals (Lanthanum to Lutetium) and the sulfides and selenides of divalent and trivalent metals which melt above 500° C. are most useful.

Among the metal fluorides, those of the metals of Groups IIa and IIIa are most useful.

Example 2 describes the procedure by which a coating mixture containing titanium dioxide and poly(p-phenylene oxide) may be prepared and applied to a substrate such as mild steel test bars and is intended to illustrate, but in no way to limit, the practice of this invention.

Example 2

Crystalline poly(p-phenylene oxide) was prepared by condensation of the potassium salt of p-chlorophenol using a copper catalyst and having inherent viscosity of .30 at one percent in concentrated sulfuric acid, was ground to pass a 100-mesh screen, and 70 g. of the fine powder was mixed with an equal weight of rutile titanium dioxide (e.g. Unitane OR–640A) by stirring in a 1-quart Waring Blendor for five minutes. During this mixing, the dry powder was twice removed from the cup and then put back to insure thorough and complete mixing.

The resulting mixture was placed in a powder fluidizer 3 inches in diameter attached to a mechanical vibrator and containing a gas-permeable membrane at its bottom. Air was passed through the membrane at a rate sufficient to give an active, flowing bed of powder 50–100 percent deeper than the static bed. Steel bars 4½″ x 1″ x ⅛″ which had been cleaned of grease, scale and sharp edges and then preheated in an oven at 330° C. for at least 30 minutes were then immersed in the fluidized bed for 1–2 seconds and immediately placed in a forced draft oven at 315° C. for 60 minutes. The cure was completed by heating the bars in a second oven at 370° C. for 60 minutes.

The resulting specimens were completely covered to the depth of their immersion with a fairly smooth, light buff colored, continuous coating 5–7 mils thick and free of pinholes and major imperfections. The Gardner impact test with a 4-pound weight dropped from a height of 40 inches (160 inch-pounds) dented the bar but did not crack the coating or expose bare metal on either the front or back side of the bar. The impacted coating did not pass an electric current when tested with a water-detergent solution using a conductivity testing apparatus sold under the trade name Model 65 Conductivity Alarm.

Similar test bars were prepared by the same method, 50 parts of the polymer being used, with other additives, and the additives, amounts used, times of cure and results of impact testing are shown in Table II.

TABLE II

| Additive | Weight | Cure time in minutes | | Gardner impact, inch-pounds |
|---|---|---|---|---|
| | | 315° C. | 370° C. | |
| $TiO_2$ | 50 | 60 | 60 | 160 |
| $ZnO$ | 50 | 60 | 60 | 160 |
| $CeO_2$ | 50 | 300 | | 160 |
| $SiO_2$ | 40 | 60 | 75 | 160 |
| $Al_2O_3$ | 50 | 300 | 30 | 80 |
| $Cr_2O_3$ | 45 | 60 | 60 | 160 |
| $ZrO_2$ | 50 | 60 | | 160 |
| $NiO_2$ | 50 | 60 | | 160 |
| $CdO$ | 50 | 60 | 60 | 160 |
| $Zn$ | 55 | 60 | | 160 |
| $Zn/TiO_2$ | 35/10 | 60 | 60 | 160 |
| $Cd/TiO_2$ | 10/40 | 60 | | 160 |
| $Al/TiO_2/Zn$ | 1.3/15/33.7 | 60 | 60 | 100 |

A group of steel bars coated with cured poly(p-phenylene oxide) containing additives having several different compositions were aged at 260° C. The results, set forth in Table III, show the excellent thermal stability of these coatings.

TABLE III

| Coating components | Proportions by weight | Inch-pounds Gardner impact after days at 260° C. | | |
|---|---|---|---|---|
| | | 8 days | 22 days | 36 days |
| Polymer/$TiO_2$ | 50/50 | 160 | 130 | 50 |
| Polymer/$TiO_2$/$Fe_2O_3$ | 50/45/5 | 160 | 130 | 40 |
| Polymer/$TiO_2$/$Cr_2O_3$ | 50/25/25 | 160 | 150 | 30 |
| Polymer/$ZnO$ | 50/50 | 160 | 160 | 50 |
| Polymer/$TiO_2$/$Zn(FeO_2)_2$ | 50/45/5 | 160 | 110 | 30 |
| Polymer/$TiO_2$/$Cr_2O_3$ | 50/37/13 | 160 | 160 | 30 |
| Polymer/$TiO_2$ | 65/35 | 160 | 80 | 10 |

Steel bars were coated with a 50/50 mixture of poly(p-phenylene oxide) (inherent viscosity 0.3 at 1 percent in concentrated sulfuric acid) and titanium dioxide by immersing the preheated bars in a fluidized bed of the powder mixture and cured by heating for 60 minutes at 315° C. and 60 minutes at 370° C. These bars were partially submerged in small bottles of various reagents at a number of test temperatures. The results, shown in Table IV, demonstrate the useful protective and anticorrosive properties of these coatings.

TABLE IV

| Liquid | Test temperature (° C) | Min. days coating unaffected [1] | Comments |
|---|---|---|---|
| Trichloroethylene | 25 | 226 | |
| $CF_2ClCFCl_2$ | 25 | 226 | |
| Glacial acetic acid | 50 | 70 | Uncoated portion of bar corroded. |
| Methyl isobutyl ketone | 50 | 226 | |
| Octyl phenol | 115 | 145 | |
| Test mixture JP–4 | 25 | 233 | |
| Test mixture JP–5 | 50 | 230 | |
| Test mixture JP–6 | 50 | 230 | |
| Diisooctyl adipate | 125 | 233 | |
| Nonyl phenol | 60 | 70 | |
| Aniline | 125 | 226 | |
| Quinoline | 125 | 226 | |
| Chlorosulfonic acid | 25 | 97 | |
| Phosphorous trichloride | 25 | 97 | |
| Sulfur | 140 | 50 | |
| 45% potassium hydroxide | 50 | 226 | |
| 5% hydrochloric acid | 50 | 208 | |
| 50% sulfuric acid | 125 | 75 | Do. |
| 85% phosphoric acid | 150 | 84 | |
| Aqua regia | 25 | 50 | Uncoated portion of bar completely eaten away. |

[1] Not time to failure but time at which the test was stopped.

Comparative tests of their electrical properties were conducted with cured poly(p-phenylene oxide) coatings, with and without additives. The polymer used had inherent viscosity 0.30 at 1 percent concentration in concentrated sulfuric acid. The compounded coating contained 50 parts of the polymer, 36 parts of titanium dioxide, 9 parts of $Cr_2O_3$ and 5 parts of zinc sulfide. The coatings were applied to steel bars by fluidized bed coating as in Example 2 above, and cured for the same time. The results obtained are set forth in Table V and show the superior properties of these coatings, particularly at elevated temperatures. The effect of the additives in reducing the dissipation factor, especially at elevated temperatures, is evident.

TABLE V.—ELECTRICAL PROPERTIES OF POLY (P-PHENYLENE OXIDE) WITH AND WITHOUT INORGANIC ADDITIVES

|  | Uncompounded poly(p-phenylene oxide) | Compounded poly(p-phenylene oxide) |
|---|---|---|
| Dielectric constant at 100 c.p.s.: | | |
| 23° C | 2.9 | 6.0 |
| 100° C | 2.9 | 5.4 |
| 200° C | 3.0 | 5.9 |
| Dissipation factor at 100 c.p.s., percent: | | |
| 23° C | .09 | .005 |
| 100° C | .08 | .005 |
| 200° C | 2.0 | .016 |
| Vol. resistivity at 23° C., ohm-cm | $10^{16}$ | $10^{16}$ |

The compounded coating had dielectric strength of 500–1000 volts/mil in thicknesses of 5–10 mils.

It has been found that these coatings are greatly improved for certain applications by the addition of metallic sulfides and metallic selenides of divalent and trivalent metals when the said metallic sulfides and/or selenides melt above 500° C. These substances when incorporated at levels as low as 1 percent by weight impart a gloss or smoothness to the coatings applied, e.g. by the fluid bed technique, which greatly enhances their appearance and makes them more desirable for applications in which uniform thickness and a regular surface are important. Among these are substrates requiring the application of a printed pattern such as for printed circuitry components.

A cured coating according to the invention made from a mixture of poly(p-phenylene oxide) and an equal weight of titanium dioxide pigment appears to be regular and evenly distributed over the surface of the substrate, though dull on ordinary visual inspection. Under an optical microscope, the coating seems to be irregular and of "orange peel" structure. The addition of a suitable sulfide or selenide to the coating formulation gives a bright and glossy coating which is much smoother and under the microscope is practically without structure. While not intending to be bound by the theory, a possible explanation for this observation is that the sulfide or selenide acts as an antioxidant and permits the coating to flow out to a melt with a smooth surface before the regular curing reaction takes over and crosslinks the coatings to a viscous and finally rigid cover.

If desired, multiple coatings can be applied, each coating being cured before applying the next layer. Thin layers cure faster than thick coatings.

While the use of leveling agents for the application of organic coatings is widely known in the art, the usual reagents for this purpose are organic compounds which are unstable under the conditions employed in the process of this invention. Therefore, they cannot be used because they give rise to blowing, gassing and the formation of discontinuities in the coating.

While any metallic sulfides or selenides which melt above about 500° C. are effective for the purpose of the invention, zinc sulfide, cadmium sulfide and cadmium selenide are particularly effective and are preferred. The zinc sulfide may be purified material, such as pigment grade (e.g. Superlith XXX300–7 which is 99 percent pure), or it may be in the form of lithopone which is a mixture of approximately 29 percent zinc sulfide and 71 percent barium sulfate. It is important that these leveling agents be finely divided powders and that they be free from volatile or unstable impurities which would cause bubbling and gassing during the coating and curing operations.

Both the trisulfide and the pentasulfide of antimony have been found to give smooth coatings when combined with poly(phenylene oxide) and other curing catalysts such as titanium dioxide. The pentasulfide decomposes at 135° C. into elemental sulfur and antimony trisulfide, and the coatings made with antimony pentasulfide have the appearance of coatings made with a comparable amount of elemental sulfur, that is, mottled with black specks. The odor of hydrogen sulfide is evident when coatings are made with either elemental sulfur or antimony pentasulfide present in the polymer-titanium dioxide mixture. Thus, antimony trisulfide, antimony pentasulfide and elemental sulfur all give smooth, improved coatings when incorporated into mixtures of titanium dioxide and poly(phenylene oxides), but antimony trisulfide is the preferred leveling agent since it does not give mottled color in its coating and the odor of hydrogen sulfide is not noticed during the coating application.

The amounts of these sulfide and selenide leveling agents which produce significant effects range from about 1 percent by weight to 50 percent or more; thus, for some applications a coating that is 55 percent zinc sulfide and 45 percent poly(phenylene oxide) is very satisfactory. Example 3 gives the proportions and conditions for a typical coating with these additives.

Example 3

Poly(p-phenylene oxide), prepared in the same way as described in Example 1, screened through a 100-mesh screen and having an inherent viscosity 0.30 in 1 percent concentration in concentrated sulfuric acid, was mixed for five minutes in a Waring Blendor with an equal weight of a mixture of 60 percent by weight titanium dioxide, 20 percent zinc sulfide and 20 percent cadmium sulfide. The additives need not be intimately mixed before addition to the polymer, but it is important that the polymer, curing catalyst and leveling agents be well mixed in the Waring Blendor or in some comparable mixing apparatus for about five minutes. Nominal mixing or simple tumbling such as is obtained in a V type mixer gives rough, inferior and often discontinuous coatings.

The article to be coated is cleaned of grease, rust and scale, but need not be sandblasted. It is heated in a furnace or oven to about 340° C. before being immersed in a fluidized bed of the powdered mixture for 1–2 seconds. It is then immediately placed in a forced draft oven for 60 minutes at 315° C. followed by 60 minutes at 370° C. At the end of this time the coating, after cooling, is smooth and light yellow and does not break on either the front or reverse side when tested at 160 inch-pounds in the Gardner impact tester. The coating is 5–7 mils thick.

The same mixture of powder in a fluidized bed is used to coat the metal base for a printed circuit made from a 6" x 9" sheet of aluminum 30–40 mils thick and perforated with holes from 40–250 mils in diameter. The metal plate is first preheated at 435° C. before being immersed in the fluidized bed for 1–2 seconds and then cured 60 minutes in a forced draft oven at 315° C. followed by 120 minutes at 370° C. The coating is smooth, continuous to an electrical conductivity test and is not penetrated by the usual pressure of a hot soldering iron at 260–315° C. The holes are fully coated on their inner sides and yet the 40 mil diameter holes are constricted a total of less than 10 mils.

Additional examples of compositions of the invention containing leveling agents are shown in Table VI, together with the useful temperature of application in a fluidized bed. The coatings are cured at the temperatures set forth above and are found to be smooth.

TABLE VI

| Leveling agent | M.P., °C. | Coating composition weight, polymer/TiO₂/leveler | Coating temp., °C. |
|---|---|---|---|
| ZnS | 1,850 | 50/45/5 | 325 |
|  |  | 45/ 0/55 |  |
| Lithopone | >1,000 | 50/25/25 | 335 |
| CdS | 1,750 | 50/45/5 | 330 |
|  |  | 50/48/2 | 330 |
| CdSe | >1,350 | 50/48/2 | 330 |
| Sb₂S₃ | 500 | 50/45/5 | 330 |
| HgS | 580 | 50/48/2 | 330 |
| SnS | 880 | 40/40/10 | 330 |
| Bi₂S₃ | 685 | 50/40/10 | 330 |
| BaS |  | 50/45/5 | 335 |

Metal fluorides are useful as viscosity regulators for the coatings of the invention and can be used with the polymer alone, or in combination with another additive such as titanium dioxide. The fluorides of aluminum, calcium, barium, strontium and magnesium are preferred; they are used in the form of anhydrous, finely powdered solids.

Example 4 describes a typical coating prepared with a metal fluoride.

Example 4

A mixture of 65 g. of poly(p-phenylene oxide) (inherent viscosity 0.30 in concentrated sulfuric acid) and 65 g. of finely divided calcium fluoride was mixed in the Waring Blendor as before and then fluidized with a stream of air. Steel bars that had been degreased and preheated to 335° C. were immersed for 1–2 seconds to apply a smooth, continuous coating 7 mils thick. The bars were then cured by heating in a forced draft oven for 60 minutes at 315° C. and 60 minutes at 370° C. The coating was not broken by a Gardner impact test of 60 inch-pounds.

Additional examples of coatings of poly(p-phenylene oxide) with metal fluorides as viscosity regulators are shown in Table VII.

TABLE VII

| Formula | Weight, percent | Cure time in minutes at— | | Withstood Gardner impact, inch-pounds |
|---|---|---|---|---|
|  |  | 315° C. | 370° C. |  |
| CaF₂ | 50 | 60 | 60 | 60 |
| BaF₂ | 50 | 60 | 60 | 120 |
| CaF₂/TiO₂ | 10/40 | 60 | 60 | 160 |
| BaF₂/TiO₂ | 10/40 | 60 | 60 | 140 |
| SrF₂/TiO₂ | 10/40 | 60 | 60 | 160 |

Pigments can be added to the formulation of the coatings where a particular color or shade is desired although such pigments must be selected in accordance with the physical and chemical compatibility requirements for additives as discussed hereinabove. As many of the additives hereinabove disclosed have significant and valuable pigmenting properties over and above their effects as viscosity regulators, leveling agents, etc., they can function as pigments if desired. Useful inorganic pigments are well known and appropriate colors are readily selected for the purpose required.

In another aspect of the invention the polymer used to make films or coatings is amorphous copoly(p,o-phenylene oxide). Polymer of this structure is amorphous, soluble in a variety of organic solvents and has a softening point far below the crystalline melting point of the all-para poly(phenylene oxide). Coatings can be made from mixtures of this polymer with the additives described above, and these mixtures are applied by the same general techniques but at lower temperatures.

Crystallization of the polymer does not occur when the coating gradually cools from the temperature of application to the glass transition temperature, and the curing reaction necessary to obtain tough, adherent, solvent-resistant coatings can be carried out at any convenient time rather than immediately after the coating has been applied. This is particularly desirable where it is not possible to quench the crystalline coating to permit postponement of the curing reaction.

Copoly(p,o-phenylene oxides) are conveniently prepared by the following process. A suitable reaction vessel is equipped with a packed reflux column having a Dean-Stark azeotrope separator, nitrogen inlet, thermometer, dropping funnel and stirring arrangement. In a typical procedure, 230 ml. of pyridine, 130 ml. of benzene, 84.1 g. of p-chlorophenol (.654 mole) and 45.3 g. of o-chlorophenol (.352 mole) are placed in the reaction vessel and 123.8 g. of 45 percent aqueous potassium hydroxide (8.11 ml./g., 1.004 mole) are added to the dropping funnel. These materials may be such as are commercially available, used as received. The entire system is flushed several times with nitrogen while adding the potassium hydroxide to the reaction mixture over a period of about 5–10 minutes.

The reaction mixture is heated to refluxing, and water is removed by azeotropic distillation by means of the Dean-Stark trap. When no further water separates, the temperature is about 120–125° C., and the reaction mixture is a light straw color. Stirring is continued while distilling out solvent until the solution temperature reaches 160° C. Then a solution of 96 mg. of CuCl in 10 ml. of pyridine is added. The temperature is maintained at 160–170° C. for 3½ hours, solvent being removed as needed. Thereafter, the temperature is increased to 250° C. for 2 hours; if the mixture begins to thicken, 70 ml. of phenyl ether is added. Heating is then discontinued, 80 ml. of pyridine are added and the entire mixture, after cooling, is poured into rapidly stirred methanol. Solid polymer precipitates.

The slurry thus obtained is filtered, and the solid is washed successively with water, methanol, dilute hydrochloric acid and methanol, then dried in a vacuum oven at 50° C. In a typical run, the yield is about 82.5 g. of polymer, or 97 percent of theoretical. The inherent viscosity, at a concentration of 1 percent in chloroform solution, is found to be 0.24. The polymer softens at 75° C., melts at 82–90° C. and flows in a melting point capillary at 180° C. The amorphous polymer is soluble in a variety of organic solvents including benzene, toluene, pyridine, chloroform, chlorobenzene and tetrahydrofuran. Differential thermal analysis shows there is no crystalline melting point and thermogravimetric analysis indicates 3 percent weight loss at 450° C. and 10 percent weight loss at 500° C.

Example 5

Finely divided copoly(p,o-phenylene oxide) made as described above, can be used as a coating as shown in Example 1, without the addition of any other agent. When cured at 315° C. for 4 hours, coatings on steel bars showed excellent Gardner impact resistance. Likewise, self-supporting films deposited from a solution of copolymer in chloroform-chlorobenzene onto aluminum foil and dried at room temperature for 2 hours and then at 70–100° C. for 2 hours, removed from the foil and finally cured at 300° C. for 3 hours, were strong, tough, transparent films which could be repeatedly folded without breaking.

Similarly as in Examples 2, 3 and 4, the copolymer can be mixed with desired amounts of various additives. Thus, for example, the copolymer can be mixed with finely divided TiO₂ in proportions of 60 parts polymer to 40 parts additive; 60 parts copolymer, 30 parts TiO₂, 10 parts Cr₂O₃; 60 parts copolymer, 30 parts TiO₂, 10 parts Fe₂O₃; 60 parts copolymer, 30 parts TiO₂, 10 parts ZnO; 50 parts copolymer, 45 parts TiO₂, 5 parts CdS; 65 parts copolymer, 25 parts TiO₂, 10 parts CdSe; 60 parts copolymer, 30 parts TiO₂, 10 parts Zn(FeO₂)₂; and 60 parts copolymer, 25 parts TiO₂, 10 parts Cr₂O₃, 5 parts ZnS. Such mixtures are cured at 315° C. for 1 hour and 370° C. for 1 hour. Coatings made in this way are smooth, adherent and resistant to impact and solvent attack.

The toughness of coatings made from poly(o,p-phenylene oxide) cured according to the invention is shown in Table VIII. The coatings with compositions as indicated were placed on metal bars by fluidized bed techniques and cured by heating at 315° C. for 60 minutes and 370° C. for 10 minutes. They were then aged at 370° C. for the periods indicated.

TABLE VIII

| Coating components | Proportions by weight | Gardner impact, inch-pounds at 370° C. after— | | |
|---|---|---|---|---|
| | | 3 hours | 7 hours | 11 hours |
| Copolymer/TiO$_2$/CdO | 61/29/10 | 80 | 160 | 160 |
| Copolymer/TiO$_2$/Zn(FeO$_2$)$_2$ | 65/25/10 | 40 | 100 | 160 |
| Copolymer/TiO$_2$/Cr$_2$O$_3$ | 60/30/10 | 60 | 100 | |
| Copolymer/TiO$_2$/Fe$_2$O$_3$/ZnS | 60/25/10/5 | 40 | 100 | |
| Copolymer/TiO$_2$/Cr$_2$O$_3$/ZnS | 60/25/10/5 | 80 | 100 | |

The solubility of amorphous copoly(p,o-phenylene oxide) or other copolyphenyl oxides in many common organic solvents provides a means of applying the coating to a variety of metal surfaces. Solutions over a wide range of concentrations may be used for this purpose, and suitable solvents include toluene, xylene, chloroform, dioxane, tetrahydrofuran, chlorobenzene, methylene chloride and pyridine. The concentration of polymer in solution is usually regulated for the method of applications, such as spraying or dipping. For instance, when the polymer has an inherent viscosity of .25 in chloroform, solutions that are 10–20 percent by weight polymer in toluene are suitable for spraying.

These solutions can also be mixed with the usual additives that have been shown to improve the properties of these coatings. The additives remain suspended in the solution for sufficient time to be applied by the usual techniques. Leveling agents, pigments and other adjuvants can also be included where the properties of these materials are desired for a particular application.

In addition, the insoluble polymers such as poly(p-phenylene oxide) can be mixed with solutions of amorphous copolymer in toluene and then applied by spraying or dipping. The finely divided insoluble polymer also remains suspended in the solution. The soluble polymer acts as a binder for the insoluble components of the mixture.

Sprayed coatings of these mixtures are dried (solvent is removed) by gentle heating and then cured by heating to the usual temperatures required for these coatings. During this process the insoluble homopolymer and the amorphous copolymer fuse together to a continuous coating reinforced by the intimately dispersed viscosity regulators, leveling agents and/or pigments. This method has the advantage that application can be made to articles of any size or shape without the need for preheating. The soluble copolymer acts as a binder for the homopolymer and adjuvants, and the resulting coating after evaporation of the solvent can be cured whenever this is convenient. The cured coatings have the features previously described for these formulations.

Example 6 shows coatings made in this way.

Example 6

A solution in 168 g. of toluene and 112 g. of methylene chloride of 30 g. of copoly(p,o-phenylene oxide) having an inherent viscosity 0.2 in one percent concentration in chloroform, was mixed with 45.6 g. of rutile titanium dioxide (Unitane OR-640A), 42 g. of poly(p-phenylene oxide) (0.3 inherent viscosity in concentrated sulfuric acid) which passed a 100-mesh sieve and 2.4 g. of cadmium sulfide yellow pigment, using a 1-quart Waring Blendor. The resulting suspension was filtered once through a cheese cloth-glass wool plug and then applied to a steel test panel. The solvent was evaporated and the coating was dried at 110° C. for 30 minutes to be tack-free. The panel was cured for 3 minutes at 470° C., followed by 60 minutes at 270° C. The resulting coating was smooth and continuous and about 3 mils thick. Its Gardner impact strength exceeded 160 inch-pounds.

Thicker coatings were also obtained by repeated application, either before or after curing of the previous coats.

For applications where adhesion to a copper substrate is required, the use of a primer coating has been found to be beneficial. The coating of a poly(phenylene oxide) after curing adheres very well to copper, but during the preheating step the copper surface is frequently oxidized. Adhesion of the cured coating to copper oxide is also excellent, but unfortunately the adhesion of copper oxide to copper is very poor, and the coating separates readily from the substrate leaving a bright, unoxidized surface on the copper article.

To prevent this, it is necessary to protect the copper surface with a thermally stable, adherent coating before the copper article is preheated to a temperature that will cause oxidation. This primer coating must be adherent to both the bright copper surface and the poly(phenylene oxide) coating and completely stable at the temperatures at which the overcoating is to be applied and cured. This is conveniently accomplished by the application of a suspension of inorganic pigments or viscosity regulators in a solution of a soluble polyarylene oxide, e.g. copoly (p,o-phenylene oxide). A particularly useful formulation contains titanium dioxide and aluminum metal pigment suspended in a solution of polymer in a chlorobenzene-chloroform mixture. This mixture is applied to the bright copper surface by spraying, brushing or dipping, and the coating is allowed to dry at room temperature and finally at 100–110° C. A second coating is frequently desirable for best results and may be applied before the object is preheated to apply the overcoating in a fluidized bed.

The following specific example illustrates this embodiment of the invention.

Example 7

The following ingredients were mixed for 3 minutes in a 1-quart Waring Blendor: 219 g. chlorobenzene; 70 g. chloroform; 60 g. copoly(p,o-phenylene oxide), 0.2 inherent viscosity in chloroform solution; 30 g. titanium dioxide (Unitane OR-640A); and 30 g. aluminum pigment (Alcoa No. 442). The resulting suspension was sprayed onto polished copper bars that had been degreased in acetone. The coatings were dried at room temperature for one hour and then in an oven at 105° C. for 30 minutes before second coatings were sprayed on and dried in the same way. The resulting coatings were 2–3 mils thick.

The bars were then heated 30 minutes in a forced draft oven at 390° C. and dipped into a fluidized bed of poly (p-phenylene oxide) formulated as follows: polymer/ TiO$_2$/Cr$_2$O$_3$/ZnS in 55/31/9/5 proportions by weight. The overcoatings were cured one hour at 315° C. and one hour at 370° C. The resulting coating was tough, continuous and could not be separated from the copper bar by cutting the edge with a knife.

A similar coating of poly(p-phenylene oxide) after fluidized bed application and curing for one hour at 315° C. and one hour at 370° C. was easily removed from the copper bar in one continuous piece by cutting the surface in any place at random and inserting the end of a spatula between the coating and the metal. The copper bar was brightly polished while the smooth underside of the tough plastic film was coated with a thin layer of copper oxide.

In another embodiment of this invention, self-supporting films are prepared by applying solutions of copoly-(p,o-phenylene oxide) to a smooth metal substrate, evaporating the solvent either at room temperature or at a slightly elevated temperature, stripping the film from the substrate, then curing the resulting film by heating in air at 315° C. for 30 minutes. The resulting films are 1–3 mils thick, and after curing are insoluble in the original solvent and are tough and flexible and unbroken after repeated folding.

In addition to metal substrates such as copper, nickel, stainless steel, Nichrome, zinc, aluminum and the like, these coatings can also be applied to glass or ceramic substrates and are particularly useful where thermal stability and resistance to reagents such as hydrofluoric acid or to strong bases such as sodium hydroxide or potassium hydroxide are required or where a moisture barrier is needed. Application can be made by any of the usual techniques such as spraying suspension or solutions, flocking dry powders onto a preheated item or immersion of a preheated item in a fluidized or static bed of powder. Preheat temperatures required for minimum and optimum curing are substantially the same as those required for metal substrates. The following example illustrates such application.

Eaxmple 8

A mixture was prepared containing the following finely divided ingredients (through 80-mesh):

| | Parts by weight |
|---|---|
| Polymer [1] | 50 |
| Mica (RM 3741, muscovite) | 27 |
| MoS$_2$ (Technicol) | 10 |
| Pb$_3$O$_4$ (reagent powder) | 10 |
| MnO$_2$ | 3 |

[1] Copoly(o,p-phenylene oxide), inherent viscosity .18 in 1 percent chloroform solution.

The total lot size was 2300 grams. This was thoroughly mixed in small batches in a "Vibratom" mixer so as to make the mixture of finely divided powders substantially homogeneous.

This mixture is storable for any desired length of time in closed containers.

For use, a portion of the mixture was placed in a fluidized bed apparatus and the gas stream (air, nitrogen or any non-toxic gas) was turned on. Ceramic resistors supported by their leads and preheated to about 250° C. were placed in the fluidized bed until covered with a uniform coating of the mixture about 3–6 mils thick. The resistors were then heated in air to 250° C. for 10 minutes. A tough, adherent, non-tacky coating having excellent dielectric properties was thus formed on the resistors. The coating was not soluble in methyl ethyl ketone at 65° C. when resistors thus coated were immersed for 10 minutes.

Using the same technique, laminated electronic circuit boards having metal sheets or strips on ceramic substrates (or high temperature rigid polymeric substrates, e.g. polyimide or polyaryloxysulfone polymers) are coated after the desired circuit has been etched into the metal. A strong, tough coating is formed, and it is found that any holes present in the board for making connections to other circuit components are not occluded. The coating can be scraped away from the metallic conductors and components can be soldered into place without affecting the remaining coating.

Example 9

The effect of certain multivalent metallic oxides as accelerators for the curing of the polyphenylene oxides in the process of the invention is shown by making mixtures of powdered copoly(p,o-phenylene oxide) with from 5 to 15 percent by weight of finely divided accelerator and 25 to 40 percent by weight of pigment (TiO$_2$, rutile). These mixtures were cured at 250° C., and the time required to develop a coating which is tack-free at 150° C. was determined. For comparison, the time required with TiO$_2$ alone was determined. The results, showing the marked accelerating effect of the accelerating agents, are set forth in Table IX.

TABLE IX

| Accelerator | Composition, polymer/TiO$_2$/accelerator (parts by weight) | Time in minutes to become tack-free |
|---|---|---|
| Pb$_3$O$_4$ | 60/30/10 | 30 |
| PbO$_2$ | 55/40/5 | 15 |
| MnO$_2$ | 55/35/10 | 15 |
| CuO.Cr$_2$O$_3$ | 60/30/10 | 15 |
| V$_2$O$_5$ | 60/25/15 | 15 |
| Co$_2$O$_3$ | 60/30/10 | 75 |
| WO$_3$ | 60/30/10 | 75 |
| PbCrO$_4$ | 60/30/10 | 15 |
| Cu$_2$O | 60/30/10 | 15 |
| CuO | 60/30/10 | 45 |
| CoCrO$_4$ | 60/30/10 | 15 |
| None | 60/40 | 210 |

The coatings described are useful in a variety of applications by virtue of their thermal stability, resistance to attack by aqueous acids and bases and many corrosive organic liquids, adhesion to metal surfaces, impact strength and electrical insulating properties. The following uses are given by way of example:

(1) electrical insulating coatings for use on wire, motor stators, metal circuit boards, motor housing, pole pieces and other electrical devices, especially those intended for use at elevated temperatures;

(2) glass or metal pipe and tube coatings and container coatings for use with hot water and steam, hot or cold aqueous acids and bases such as sulfuric acid, hydrochloric acid, aqueous sodium hydroxide or potassium hydroxide;

(3) protective coatings for metals exposed to high temperatures such as radiators, hot gas stacks, stoves, ovens, calrod heating elements, engine exhausts, driers, charcoal heated cooking devices, refinery or chemical process equipment, or heating elements wound on ceramic cores;

(4) tools and tool handles, appliance handles, appliance coatings and covers;

(5) equipment for use in electroplating baths such as hooks, tacks, and conveyor assemblies;

(6) electronic components such as transistors, diodes, integrated circuits or resistors.

What is claimed is:

1. The process for producing essentially amorphous polyarylene oxide polymers having improved thermal stability and resistance to solvent and chemical attack, consisting essentially of heating uncured, substantially linear unsubstituted polyphenylene oxide polymer made by condensation of alkali metal halophenolate having inherent viscosity not less than about 0.1 when amorphous and about 0.2 when crystalline in the presence of oxygen at a temperature in the range of about 200° to 470° C., and in any event not lower than the crystalline melting point of said polymer, for a time sufficient to render the polymer tack-free at 150° C.

2. The process according to claim 1, in which the uncured polyphenylene oxide contains as finely divided, solid inorganic additive material dispersed therein pigment, metal, metal fluoride or metal chalogenide.

3. The process according to claim 1, in which the polymer includes a finely divided leveling agent of the group consisting of sulfides and selenides of divalent metals and trivalent metals, which sulfides or selenides melt above about 500° C.

4. The process according to claim 1, in which the polymer includes a finely divided polyvalent metal oxide in a higher valence form thereof as an accelerator for curing.

5. The process according to claim 1, in which the polymer is amorphous polyphenylene oxide.

6. The process according to claim 1, in which the polymer is crystalline poly(p-phenylene oxide).

7. The process according to claim 1, in which the polymer is a copoly(o- and p-phenylene oxide).

8. A shaped article of manufacture comprising crosslinked unsubstituted polyphenylene oxide polymer made by condensation of alkali metal halophenolate which is substantially infusible, tack-free at 150° C., substantially insoluble in diphenyl ether at 250° C., essentially amorphous and is characterized by weight loss of less than 10 percent when heated in air to 450° C. at the rate of about 10° per minute.

9. An article according to claim 8, in which the polymer is a poly(p-phenylene oxide).

10. An article according to claim 8, in which the polymer is a copoly(p, o-phenylene oxide).

11. A self-supporting film comprising crosslinked unsubstituted polyphenylene oxide polymer made by condensation of alkali metal halophenolate which is essentially amorphous, substantially infusible, tack-free at 150° C., characterized by weight loss of less than 10 percent when heated in air to 450° C. at the rate of about 10° per minute, and having degree of toughness of at least 1.

12. A film according to claim 11, containing as finely divided solid inorganic additive pigment, metal, metal fluoride or metal chalcogenide.

13. A storable premixed powder adapted to fabrication by the fluidized bed process into cured polymeric coatings having improved properties, comprising in admixture finely divided, uncured, substantially linear, solid unsubstituted polyphenylene oxide polymer made by condensation of alkali metal halophenolate having inherent viscosity not less than about 0.1 when amorphous and 0.2 when crystalline, and about 1 to 50 percent by weight, based on the weight of said polymer, of at least one metal fluoride or metal chalcogenide as finely divided solid inorganic additive material.

14. A premixed powder according to claim 13, containing as additives mica, molybdenum disulfide, lead oxide and manganese dioxide.

15. A composition according to claim 13, in which the additive is titanium dioxide.

16. A composition according to claim 13, in which the additive is a polyvalent metal oxide.

17. A liquid, storable premixed composition adapted to fabrication into cured polymeric coatings having improved properties, comprising in admixture uncured, substantially linear, solid unsubstituted polyphenylene oxide polymer made by condensation of alkali metal halophenolate having inherent viscosity not less than about 0.1 amorphous and 0.2 when crystalline, up to about 60 percent by weight based on the weight of said polymer of at least one metal fluoride or metal chlocogenide as finely divided solid inorganic additive material, and an organic solvent for said uncured polymer.

18. A polymer according to claim 17, in which the uncured polymer includes finely divided insoluble polymer.

19. An article of manufacture consisting of a substrate having on at least a portion of the surface thereof a tough, adherent coating comprised of crosslinked polyphenylene oxide made by condensation of alkali metal halophenolate which is substantially infusible, tack-free at 150° C., substantially unaffected by common organic solvents, essentially amorphous and is characterized by weight loss of less than 10 percent when heated in air to 450° C. at the rate of about 10° per minute.

20. An article according to claim 19, in which the coating contains finely divided metal chalcogenide dispersed therein.

21. An article according to claim 19, in which the substrate is chosen from the group consisting of glass, metal and ceramic.

22. An article according to claim 19, in which the substrate is copper which has been protected by an oxidation-preventive primer coating.

23. A coated article consisting of an at least partially electrically conductive substrate which is not adversely affected by heating to a temperature in the range of 200° to 470° C., having on at least a portion of the surface thereof a coating consisting of essentially amorphous crosslinked unsubstituted polyphenylene oxide made by condensation of alkali metal halophenolate which is substantially infusibe, tack-free at 150° C., substantialy unaffected by common organic sovents, essentially amorphous and is characterized by weight loss of less than 10 percent when heated in air to 450° C. at the rate of about 10° per minute.

24. An article according to claim 23, in which the polyphenylene oxide contains from about 5 to 75 percent by weight of finely divided solid inorganic additive agent dispersed therein, of the class consisting of metal, metal fluoride, sulfides and selenides of divalent metals and trivalent meals, which sulfides and selenides melt above about 500° C., and polyvalent metal oxides in a higher valence from thereof.

25. An electrical resistor having a coating comprising essentially amorphous crosslinked unsubstituted polyphenylene oxide made by condensation of alkali metal halophenolate which is substantially infusible, tack-free at 150° C., substantially unaffected by methyl ethyl ketone at 65° C. and is characterized by weight loss of less than 10 percent when heated in air to 450° C. at the rate of about 10° per minute.

26. An electronic circuit board coated with crosslinked unsubstituted polyphenylene oxide made by condensation of alkali metal halophenolate which is substantialy infusible, tack-free at 150° C., substantially unaffected by methyl ethyl ketone at 65° C., essentially amorphous and is characterized by weight loss of less than 10 percent when heated in air to 450° C. at the rate of about 10° per minute.

References Cited

UNITED STATES PATENTS

| | | | |
|---|---|---|---|
| 3,306,875 | 2/1967 | Hay | 260—47 |
| 3,373,226 | 3/1968 | Gowan | 260—874 |
| 3,228,910 | 1/1966 | Stamatoff | 260—47 |

OTHER REFERENCES

P. H. Emmett, Catalysis, vol. VII, Reinhold, N. Y. 1960 (pages 364–65 supplied).

WILLIAM H, SHORT, Primary Examiner

M. GOLDSTEIN, Assistant Examiner

U.S. Cl. X.R.

117—75, 123, 124, 128.4, 132, 217, 227, 229, 230, 232; 260—33.6, 33.8, 37, 47

UNITED STATES PATENT OFFICE
CERTIFICATE OF CORRECTION

Patent No. 3,455,736                  July 15, 1969

Horace R. Davis et al.

It is certified that error appears in the above identified patent and that said Letters Patent are hereby corrected as shown below:

Column 3, line 52, "inserent" should read -- inherent --. Column 9, line 11, "40/40/10" should read -- 50/40/10 --. Column 12, line 48, "219" should read -- 210 --; line 49, "coply(p,o-" should read -- copoly(p,o- --. Column 14, line 14, "$V_2O$" should read -- $V_2O_5$ --; line 63, "chalogenide" should read -- chalcogenide --.

Signed and sealed this 5th day of May 1970.

(SEAL)
Attest:

Edward M. Fletcher, Jr.                WILLIAM E. SCHUYLER, JR.
Attesting Officer                        Commissioner of Patents